UNITED STATES PATENT OFFICE.

JAMES BENTON PAGE, OF EL PASO, TEXAS.

MANUFACTURE OF VINEGAR.

1,171,065.		Specification of Letters Patent.		Patented Feb. 8, 1916.

No Drawing.		Application filed December 8, 1913.   Serial No. 805,278.

*To all whom it may concern:*

Be it known that I, JAMES BENTON PAGE, a citizen of the United States, residing at El Paso, in the county of El Paso and State of Texas, have invented certain new and useful Improvements in the Manufacture of Vinegar, of which the following is a specification.

This invention relates to the manufacture of vinegar; and it comprises as a new dietary article a full-flavored, full-bodied table vinegar having a particular aromatic flavor and containing in addition to water and acetic acid the characteristic non-fermentable or non-saccharine soluble flavor giving substances of melon juice; and it also comprises a method of preparing such a vinegar wherein the juice of melons, which is best subjected to a preliminary concentration to give body and added flavor, is subjected to an acetifying treatment, as by extracting juice from melons, removing flock and fiber therefrom by a clarifying treatment, fermenting and acetifying, such juice advantageously being somewhat concentrated prior to the fermenting and acetifying in order to improve the color, to give a standard concentration and to develop certain changes in the aroma and flavor; all as more fully hereinafter set forth and as claimed.

In the manufacture of table and preserving vinegars from various saccharine liquids, the nature of such a liquid plays an important part in the quality and properties of the article produced. The acid is produced from the sugars present, but the other constituents present play an important part, not only in regard to the course of the fermentation and acetification but also as to the properties of the resulting product. The quality of a vinegar depends mainly upon its flavor and preserving effect and these are the main factors in determining its value; otherwise the chemical composition of all vinegars is very much alike. They are all dilute solutions of acetic acid containing other soluble and volatile aroma-giving and flavoring constituents. The aroma and flavor depend partly upon various volatile bodies whose composition is not certainly known and which vary with the particular materials used in making vinegar. The soluble non-volatile constituents play an important part since upon their nature depends not only much of the flavor but the "body" of the vinegar. Solutions of acetic acid merely containing volatile flavoring ingredients like the acetic esters are too "thin" to be palatable and, in fact, are not vinegars. It is on its content of volatile flavor and aroma-giving bodies and soluble taste-giving and taste-reinforcing constituents that the value of a vinegar depends not only for table purposes but also for preserving. Owing to a deficiency in this matter of taste-giving and taste-reinforcing bodies, vinegars from many fruit juices are too "thin" and do not have the full-bodied taste that is desirable in a good quality of vinegar. Neither do they function as efficiently in preserving as is desirable. Much of the preservative effect of a vinegar depends upon its aromatic constituents.

I have found that on taking the juice of water-melons and converting it into vinegar I obtain a desirable full-bodied, full-flavored taste; that I obtain a vinegar of a clean, pure, tart taste which is aromatic and is not "thin" and which has excellent preservative properties. As to the exact nature of the constituents of the melon juices which give me these results in the vinegar I am not certain and I content myself with noting the desirable results obtained.

The juice of the watermelon, or the juice of the heart of the watermelon, is, ordinarily, of a reddish appearance but this is due to suspended flock and tissue in the juice. In the present process it is highly desirable that all this suspended matter be preliminarily removed, which may be done by filtration, defecation, centrifugals, etc. So clarified, the juice is a waterwhite liquid containing from 3 to 7 per cent. of sugars and having a total solids content of from 8 to 10 per cent. About 3 to 7 per cent. of the juice ordinarily is fermentable matter.

These juices if treated in the state in which obtained after clarifying, give a vinegar of good quality but rather weak in acid and rather white in color. Therefore I advantageously concentrate the juice prior to further treatment. This concentration, which may be effected in any convenient type of apparatus, such as a vacuum pan, multiple effect, etc., is advantageously performed at a low temperature. Evaporation in open vessels frequently gives too much color and too pronounced a taste. I find that evaporating the juice somewhat at a low temperature prior to making vinegar is very desirable and is an important factor in producing a perfect product. After the desired degree of concentration is obtained, I may then temporarily increase the heat to comparatively a high temperature to heighten the color if insufficient color is given in the evaporation. The temperature of evaporation and the time of evaporating best suited will depend upon the color and acidity which are to be obtained. Some slight change is produced by this heating operation in the soluble substance of the juice which materially improves the flavor of the resulting product. The color-giving heating after evaporation also aids materially in this improvement and gives an "aging" effect. It is generally desirable, apart from other reasons, since melon juices are quite variable in their saccharine and other content, to evaporate the liquid to a standard density. A density corresponding to a sugar content of about 8 per cent. is advantageous. An 8 per cent. sugar content will give a vinegar of an acidity corresponding to about 5 per cent. acetic acid, which is a standard strength.

The liquid may be abandoned to spontaneous fermentation, or may be "set" with yeast, etc. Spontaneous fermentation is not as good as setting with yeast, as it takes too long. The melon juice, as a matter of fact, is rather poor in proteids and is not very favorable to bacterial yeast or other fermentation. A pasteurization prior to fermentation of the juice will insure its remaining sterile for long periods of time, even if exposed to the air. Probably some of the constituents are more or less antiseptic in their nature and it is to their presence in the juice, very likely, that the high preserving value of the vinegar is due. The juice may however be quickly and readily fermented by the addition of small amounts of yeast. This yeast may come from a previous setting or may be fresh yeast from another source. It is often desirable to freshen the yeast, where the same yeast is used, by treatment with nutrient solutions, such as wort, prior to using it in the melon juice. The use of special races of aroma-giving yeast organisms is not ordinarily advantageous since it tends to disturb the particular and desirable flavor of the vinegar obtained in the present method. After a period of fermentation which may last from one to two days, the liquid may be passed over acetifying organisms on beech shavings in the presence of air. I find however that a special method of acetifying is particularly advantageous with this material. The acetifying organism may be obtained from any suitable source. In acetifying I may cause the juice to flow progressively through a series of vessels, all inoculated with the organism, and each vessel being provided with means for aerating the liquid therein. There may be three or more of these vessels deriving air from a common source. This air in passing through the juice and vinegar takes up more or less of the special volatile parts which give this vinegar much of its value and also tends to take up more or less alcohol and aldehyde, acid, etc. For this reason I advantageously turn the air which has gone through the acetifying liquid back into and through the fresh or concentrated melon juice which is subsequently to be acetified in order to recover volatile matter carried forward by such air. The juice may be advantageously a current of liquid flowing forward to the acetifying apparatus. The air may be sent through a cooler or refrigerator prior to reëntering the juice.

The vinegar thus obtained is ready for bottling and preservation without further treatment. Pasteurization, etc., are not necessary. It shows great keeping properties, being practically free from albumenoids and other constituents on which microörganisms can thrive. This vinegar contains acetic and other acids in amounts proportionate to the original sugar content of the juice treated and it also contains most of the natural soluble substances, other than sugar which has been converted into acid, of the original juice, such soluble substances being however, in the case of concentrated material, somewhat modified by the concentrating operation described. Some portion of the solubles are changed in the fermentation and acidification to give volatile aroma-yielding constituents of a particularly delicate and palatable flavor. It is a vinegar of a mellow full-bodied character and has the characteristics of an "aged" vinegar. It is not necessary to store it for aging in oak casks and the like, as is customary with other vinegars. The aging effect is given in the evaporation, or evaporating and heating, treatment described. It may however be further aged if desired, but it is not ordinarily necessary or desirable.

While I have more particularly hereinbefore described, the treatment of watermelons, since they are the most advantageous and indeed the only melons which will give me the particular flavor and quality of vinegar desired in the present invention, yet it will be understood that my process may also be applied to other melons, such as cantaloupes, musk melons, etc. These other melons however give vinegar of different flavor and quality.

While, as stated, any convenient method of extracting the juice of the melon may be employed, I prefer to operate in a rather methodical manner. As it comes from the field, the interior of the melon is absolutely sterile and if the outer rind of the melon be sterilized a clean, pure juice is obtained. Therefore it is advantageous so to operate. In practice I find it advantageous to take the melons as received from the field, wash and expose to sterilizing streaming steam, hot water sprays and the like. The melons may, for example, be delivered into a body of water, then taken by a conveyer and exposed to steam or hot water in transit. The melons may then be pressed in any suitable device. A screw press is convenient. The fiber and seeds may be used for feed purposes, being separated or not as may be desired. Where the rind is desired for special purposes, it may be separated from the heart of the melon prior to the pressing operation. The pressed juice may then advantageously be clarified in a centrifugal or by other suitable means. The clarified juice may then be heated and otherwise treated as hereinbefore described.

What I claim is:—

1. In the manufacture of table vinegar, the process which comprises fermenting and acetifying melon juice and aging to produce table vinegar.

2. The process of producing a vinegar which comprises concentrating, fermenting and acetifying melon juice.

3. The process of producing a vinegar which comprises concentrating melon juice until a desired color develops, and then fermenting and acetifying the concentrated juice.

4. The process of producing a vinegar which comprises clarifying melon juice, heating the clarified juice till a brown color develops, and then fermenting and acetifying such juice.

5. The process of producing a vinegar which comprises clarifying melon juice, subjecting the juice to a heating operation comprising an evaporation at a low temperature and a subsequent short heating to a higher temperature, and then fermenting and acetifying the treated juice.

6. As a new article of manufacture, a table and preserving vinegar comprising water, acetic acid, volatile aroma-giving constituents and the characteristic soluble non-saccharine flavor-giving solids of melon juices, such non-saccharine solids having substantially the constitution of those present in natural melon juice.

In testimony whereof, I affix my signature in the presence of two subscribing witnesses.

JAMES BENTON PAGE.

Witnesses:
K. P. McELROY,
H. SCHOENTHAL.